(12) United States Patent
Lakhdhir

(10) Patent No.: US 7,934,212 B2
(45) Date of Patent: Apr. 26, 2011

(54) APPARATUS, SYSTEM AND METHOD FOR DETECTING OLD VERSIONS OF AN APPLET IN A CLIENT BROWSER'S JVM

(75) Inventor: Mansoor A. Lakhdhir, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1281 days.

(21) Appl. No.: 11/466,481

(22) Filed: Aug. 23, 2006

(65) Prior Publication Data

US 2007/0078947 A1    Apr. 5, 2007

Related U.S. Application Data

(62) Division of application No. 09/645,156, filed on Aug. 24, 2000, now Pat. No. 7,131,122.

(51) Int. Cl.
*G06F 9/44* (2006.01)
(52) U.S. Cl. ........ 717/170; 717/168; 717/171; 717/172; 717/173
(58) Field of Classification Search .................. None
See application file for complete search history.

(56) References Cited

U.S. PATENT DOCUMENTS

| | | | |
|---|---|---|---|
| 5,920,725 A | 7/1999 | Ma et al. | |
| 5,974,428 A | 10/1999 | Gerard et al. | |
| 6,003,042 A | 12/1999 | Melahn | |
| 6,074,434 A | 6/2000 | Cole et al. | |
| 6,128,701 A | 10/2000 | Malcolm et al. | |
| 6,138,141 A | 10/2000 | DeSimone et al. | |
| 6,272,677 B1 | 8/2001 | Lam et al. | |
| 6,324,685 B1 | 11/2001 | Balassanian | |
| 6,353,926 B1 | 3/2002 | Parthesarathy et al. | |
| 6,360,366 B1 * | 3/2002 | Heath et al. | 717/178 |
| 6,535,894 B1 | 3/2003 | Schmidt et al. | |
| 6,571,389 B1 | 5/2003 | Spyker et al. | |
| 6,651,249 B2 | 11/2003 | Waldin et al. | |
| 6,718,549 B1 * | 4/2004 | Narin et al. | 717/178 |
| 6,874,142 B1 * | 3/2005 | Ogura | 717/170 |
| 7,143,337 B2 * | 11/2006 | Landsman et al. | 715/234 |
| 7,185,332 B1 * | 2/2007 | Waldin et al. | 717/170 |
| 7,366,996 B2 * | 4/2008 | Hoyle | 715/854 |
| 7,689,983 B2 * | 3/2010 | Kitayama | 717/170 |
| 7,711,922 B2 * | 5/2010 | Jerding et al. | 711/170 |
| 7,734,721 B2 * | 6/2010 | Meyer et al. | 709/218 |
| 2002/0002703 A1 * | 1/2002 | Baentsch et al. | 717/11 |
| 2002/0092010 A1 * | 7/2002 | Fiske | 717/168 |
| 2002/0116702 A1 * | 8/2002 | Aptus et al. | 717/170 |

* cited by examiner

*Primary Examiner* — Insun Kang
(74) *Attorney, Agent, or Firm* — Yee & Associates, P.C.; Jeffrey S. LaBaw

(57) ABSTRACT

An apparatus, system and method for checking the version of a cached applet on a client device against version information stored on a host server is provided. By checking the version of the applet, it can be determined whether or not the applet is still usable with the host server. If an applet is not usable with the host server, the applet is either automatically updated to a current version or the user is provided with information as to how to update the applet to the current version. If an applet is usable with the host server but is not a current version of the applet, the user may be informed of this fact and given the opportunity to either update the applet or continue to execute the older version of the applet. If the user chooses to update the applet, the update is performed in substantially the same manner as that described above. If the user chose to continue with the older version of the applet, the mainline code of the older version of the applet is executed.

13 Claims, 6 Drawing Sheets

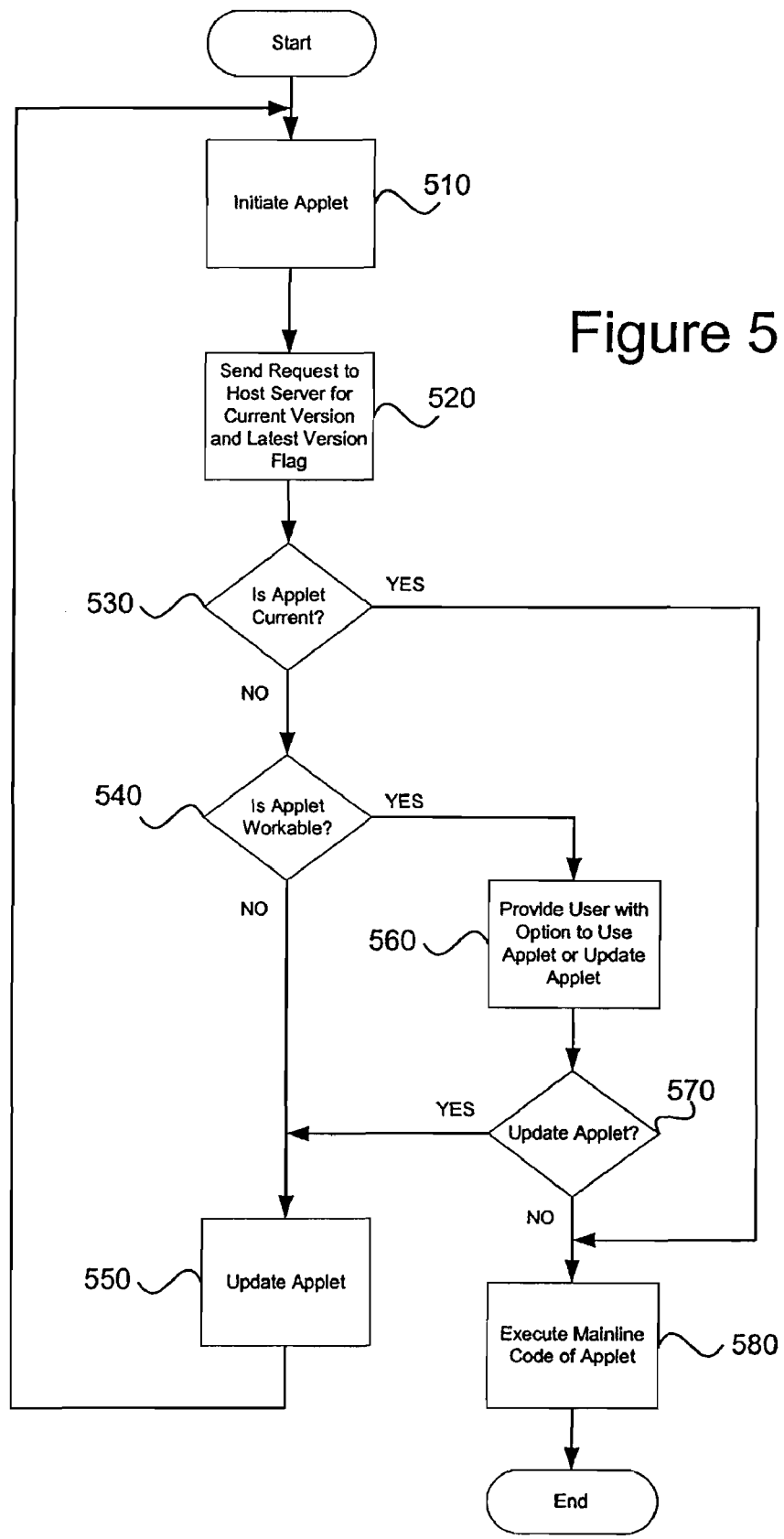

APPARATUS, SYSTEM AND METHOD FOR DETECTING OLD VERSIONS OF AN APPLET IN A CLIENT BROWSER'S JVM

This application is a divisional of application Ser. No. 09/645,156, filed Aug. 24, 2000, status allowed (U.S. Pat. No. 7,131,122), which is herein incorporated by reference.

BACKGROUND OF THE INVENTION

1. Technical Field

The present invention is directed to an apparatus, system and method for detecting old versions of an applet in a client browser's Java™ Virtual Machine (JVM). In particular, the present invention provides a mechanism by which old versions of an applet are identified and a determination is made as to whether the applet is still functional with the server or needs to be updated.

2. Description of Related Art

An applet is a program written in the Java programming language which can be included in HyperText Markup Language (HTML) pages much in the same way an image is included. Applets provide functionality to Web pages for providing users with information, entertainment, and for gathering information from users.

When a user employs a Java technology enabled browser in his/her client device to view a web page that contains an applet, the applet's bytecode is transferred to the client device's browser system and executed by the browser's Java Virtual Machine (JVM). Typically, a browser will cache the Java classes which make up an applet. This becomes a problem when a developer updates and deploys the Java code on the server that makes up the applet. The problem arises in that the cached version of the applet in the client JVM may not be compatible with the updated Java code on the server.

In such a case, a two principal situations may arise. First, if the developer has added any new classes in this updated Java code, the older cached Java classes will not work with these new Java classes. In this case the applet will halt with an exception.

The details of such an exception can be seen clearly in the Java Console of the browser. However, most end users are lay people and are not able to understand what happened to cause the exception. As a result, the end user may become frustrated, thereby creating a customer satisfaction issue.

To resolve this customer satisfaction issue, the end user typically will either abandon their efforts on the web page and search elsewhere or will contact a customer support representative. In the latter case, resolving this issue takes up customer support time because the support representative must recreate the user scenario and then guide the user in clearing the cached Java classes.

Clearing the cached Java classes is not a simple operation. Just clearing the regular browser cache does not clear the cached Java classes in the JVM. Furthermore, the two most popular browsers, Netscape Communicator™ and Microsoft Internet Explorer™, have different procedures to clear the cached classes.

Even if no new classes were added in the updated Java code, if a database transaction message format with the host server was changed by the update to the Java code, then the cached applet will have problems communicating with the host server. As a result, the user will experience a number of communication errors which again results in a customer satisfaction and support issue.

Thus, it would be beneficial to have an apparatus, system and method for detecting old versions of an applet in a client browser's JVM. It would further be beneficial to have an apparatus, system and method that identifies old versions of an applet and a determines whether the applet is still functional with the host server or needs to be updated.

SUMMARY OF THE INVENTION

The present invention provides an apparatus, system and method for checking the version of a cached applet on a client device against version information stored on a host server. By checking the version of the applet, it can be determined whether or not the applet is still usable with the host server. If an applet is not usable with the host server, the applet is either automatically updated to a current version or the user is provided with information as to how to update the applet to the current version.

If an applet is usable with the host server but is not a current version of the applet, the user may be informed of this fact and given the opportunity to either update the applet or continue to execute the older version of the applet. If the user chooses to update the applet, the update is performed in substantially the same manner as that described above. If the user chose to continue with the older version of the applet, the mainline code of the older version of the applet is executed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart outlining an exemplary operation of the present invention.

DETAILED DESCRIPTION OF THE PREFERRED EMBODIMENT

Figure 1:
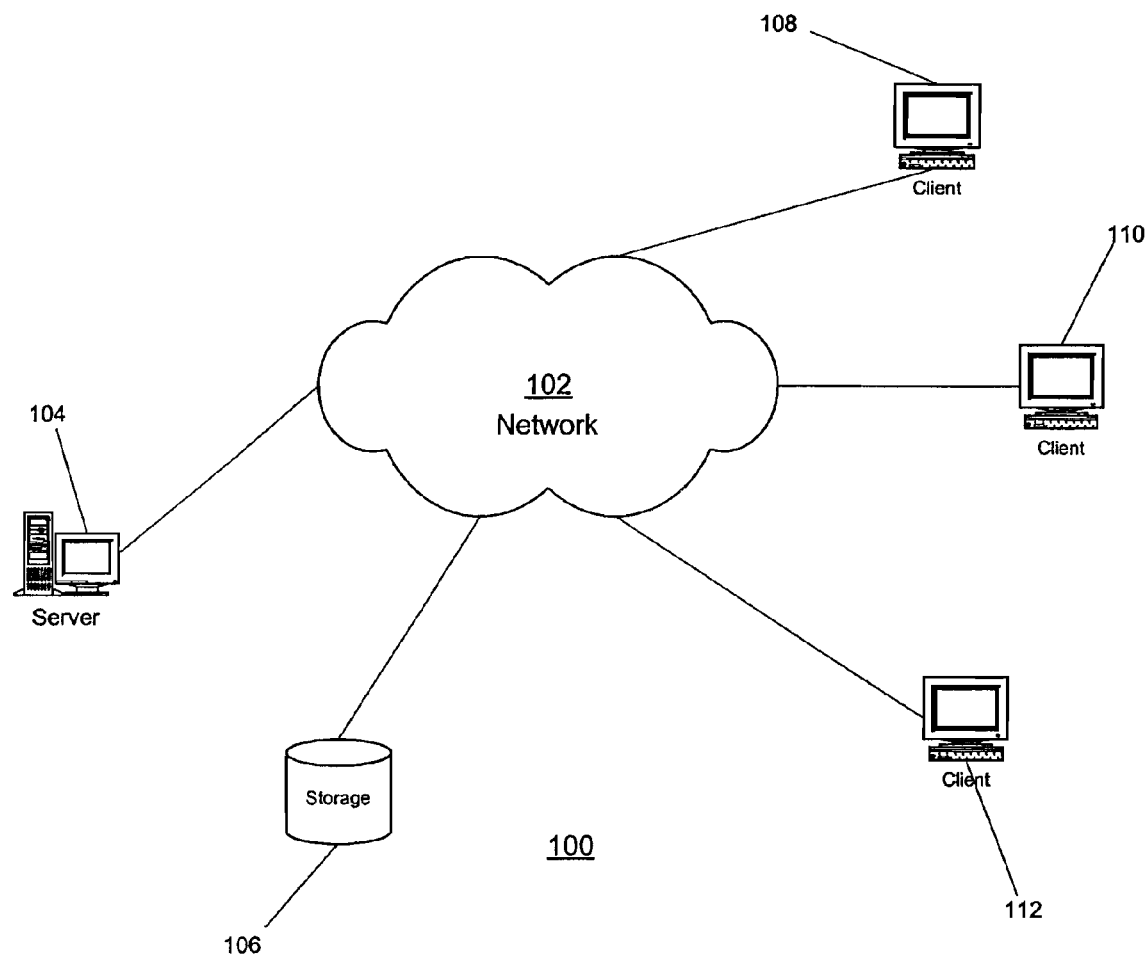
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
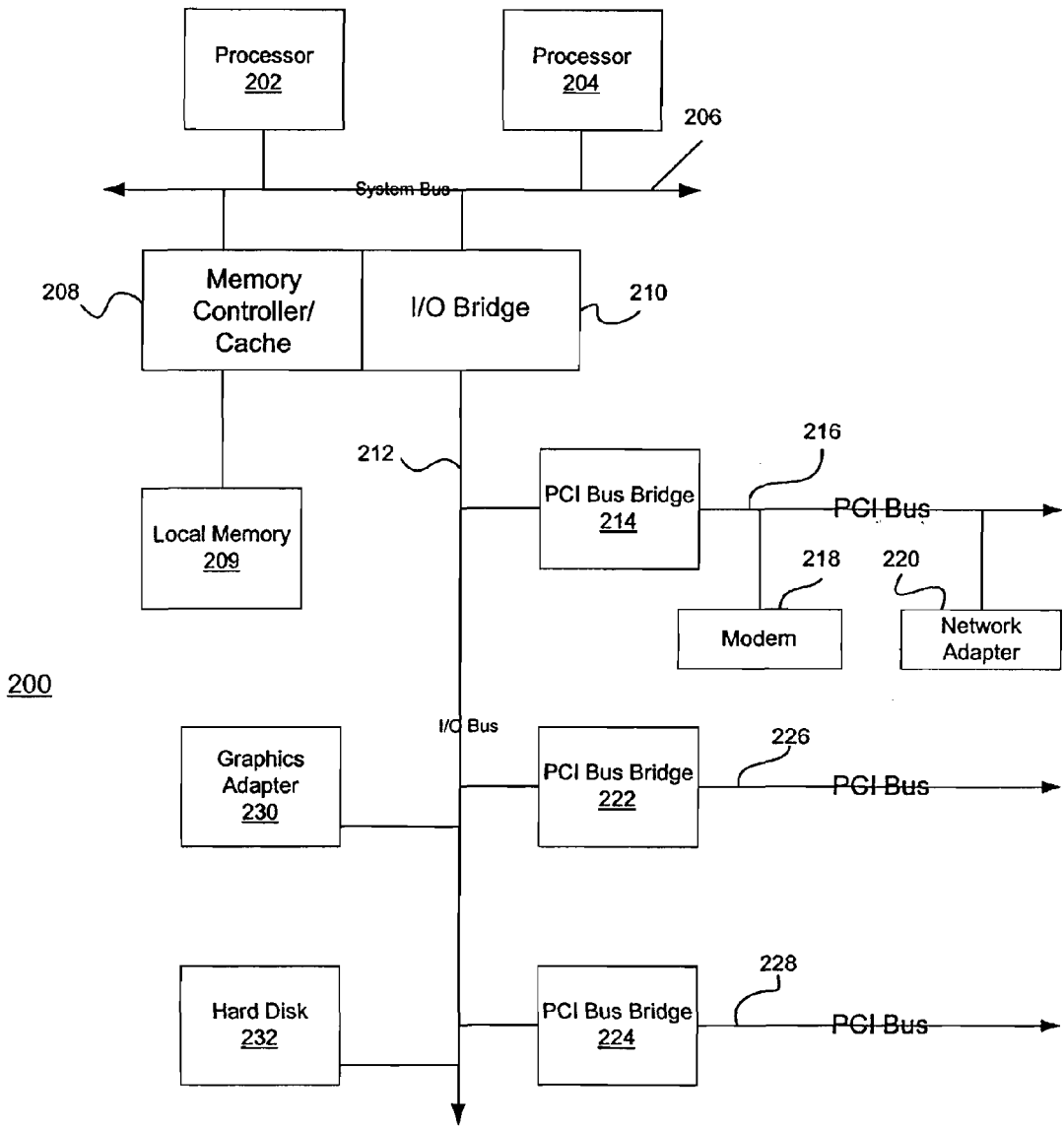
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
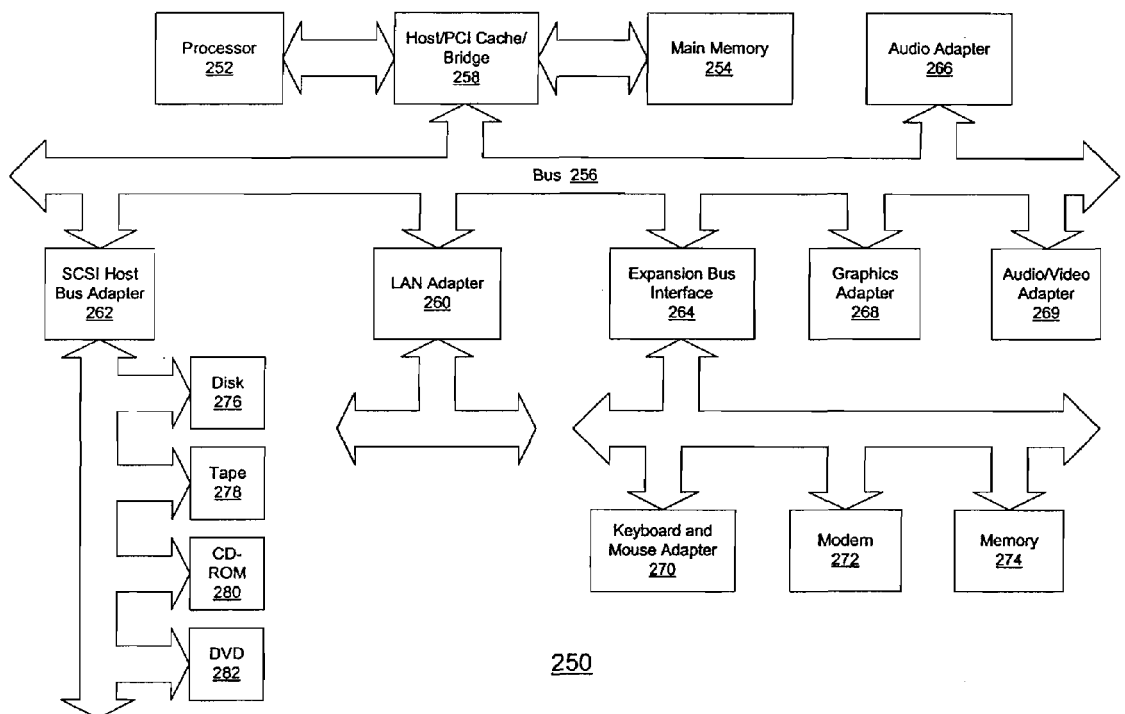
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as OS/2, which is available from International Business Machines Corporation.

An object oriented programming system such as JAVA may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

Although the present invention may operate on a variety of computer platforms and operating systems, it may also operate within an interpretive environment, such as a REXX, Smalltalk, or Java runtime environment, and the like. For example, the present invention may operate in conjunction with a Java Virtual Machine (JVM) yet within the boundaries of a JVM as defined by Java standard specifications. In order to provide a context for the present invention with regard to an exemplary interpretive environment, portions of the operation of a JVM according to Java specifications are herein described.

Figure 3A:
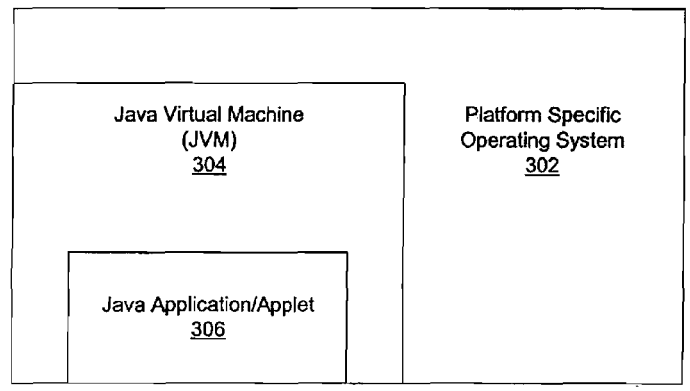
FIG. 3A is a block diagram illustrates the relationship of software components operating within a computer system that may implement the present invention.

With reference now to FIG. 3A, a block diagram illustrates the relationship of software components operating within a computer system that may implement the present invention.

Java-based system 300 contains platform specific operating system 302 that provides hardware and system support to software executing on a specific hardware platform. JVM 304 is one software application that may execute in conjunction with the operating system. Alternatively, JVM 304 may be imbedded inside a Java enabled browser application such as Microsoft Internet Explorer™ or Netscape Communicator™. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAS.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, JAVA is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
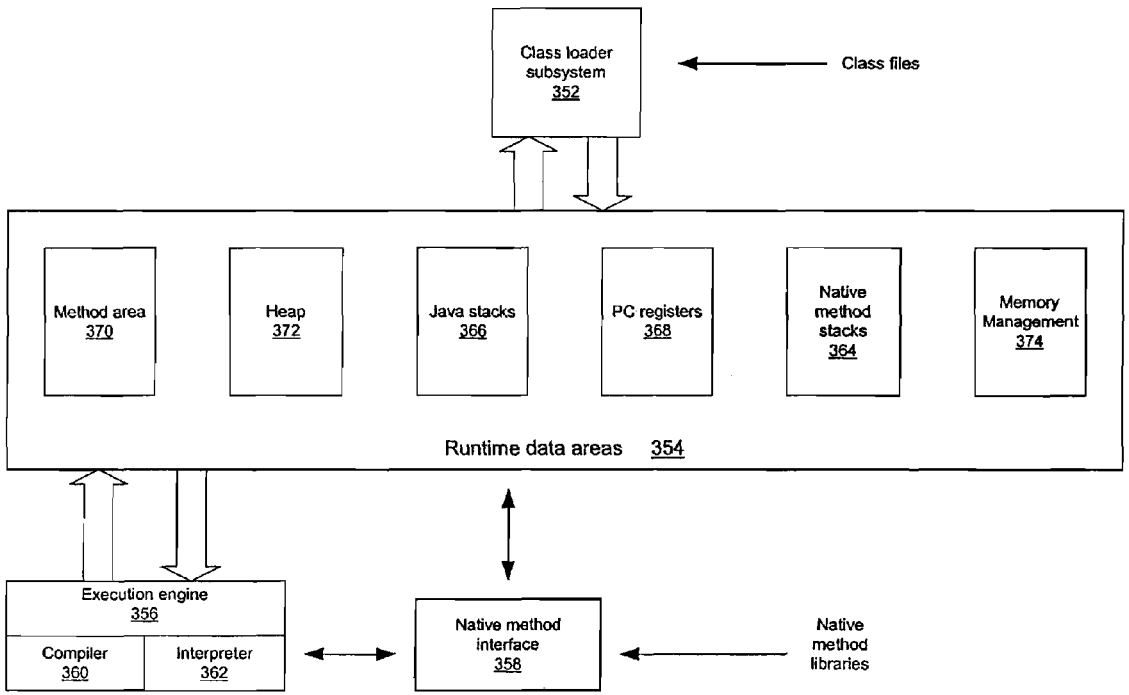
FIG. 3B is an exemplary block diagram of a Java Virtual Machine (JVM) according to the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it.

The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory.

Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The present invention provides a mechanism by which the versions of applets executed by the JVM may be checked to determine if the applets are still operational with the host server. With the present invention, an applet may have one of three version states: old and in need of updating, old and workable with the host server, and current. Only when the applet is old and in need of updating will the present invention not run the applet's mainline code which would result in an exception when the JVM attempts to execute the applet's bytecode. If the applet is current, no updating is necessary and the applet functions normally. If the applet is old and workable, the JVM may provide the user of the client device with the option of updating the applet before proceeding or continuing with the old version of the applet.

Figure 4:
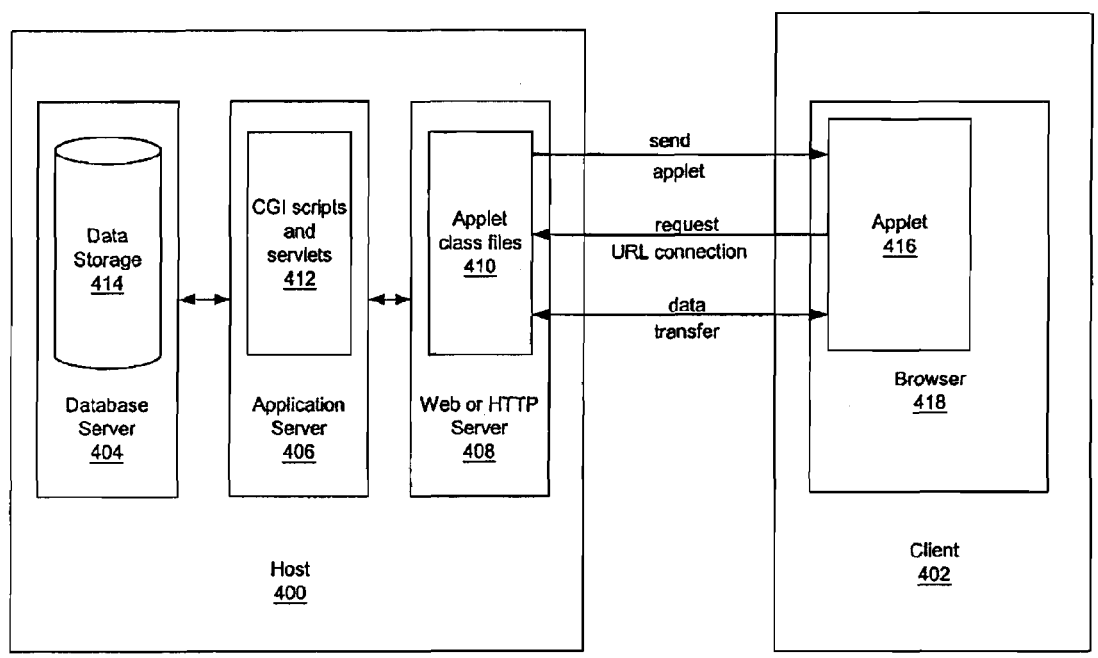
FIG. 4 is a diagram illustrating components and data flow used to provide communication between a client and a host in accordance with a preferred embodiment of the present invention.

With reference now to FIG. 4, a diagram illustrating components and data flow used to provide communication between a client and a host is depicted in accordance with a preferred embodiment of the present invention. In this example, communication is provided between host 400 and client 402. In this example, host 400 includes a database server 404, an application server 406, and a web server 408. Web server 408 also is referred to as an HTTP server. Web server 408 handles all the HTTP requests coming into a website. Then, web server 408 hands off the request to the application server 406, which then talks to the database server 404 if necessary to access data or write data. Also, all responses from the website go out, to the client, through web server 408.

Web server 408 also includes a directory that contains the Java class files and the graphics files such as .gifs, .jpegs, etc. In this example, web server 408 includes applet class files 410. Application server 406 runs the Common Gateway Interface (CGI) scripts. This server has a servlet engine to run servlets. In this example, application server 406 contains CGI scripts and servlets 412. Database server 404 is used to store and access data, such as in data storage 414. These three servers (daemon processes) can all run on one machine or each server can run on its own separate dedicated machine.

The data storage 414 stores a version table for applets supported by the host 400. The version table contains information identifying the applet, the various versions of the applet that have been released, and the current status of each version. Each version of an applet may have one of three statuses: current, old and in need of update, or old and workable, as will be discussed in greater detail hereafter.

There are many different ways in which the version table may be stored for use by the present invention. The present invention is intended to encompass all possible version table storage mechanisms and methods. However, as an example of one embodiment, the version table may be stored on a back-end DB2 application version table. DB2 is a Relational Database Management System (RDBMS), available from International Business Machines, Inc., that is a full-featured Structured Query Language (SQL) language RDBMS. An example of such a version table may be:

```
CREATE TABLE MASTR.APPL_VERSION
-------------------------------
(
APPL_NAME VARCHAR(30) NOT NULL,
VERSION_NBR VARCHAR(10) NOT NULL,
   --format Vv.Rr.Mmmm
LATEST_VERSION_FLG CHAR(1) NOT NULL,
PRIMARY KEY (APPL_NAME, VERSION_NBR),
FOREIGN KEY FLG(LATEST_VERSION_FLG)
    REFERENCES MASTR.YES_NO_DOMAIN ON
    DELETE RESTRICT
)
```

The version table may take the form of that shown in Table 1 below, for example. As shown in Table 1, there are entries for applet name, applet version, and a latest version flag. For each applet name and applet version, there is a corresponding latest version flag identifying the applet version as being old and in need of update, old and workable or current.

TABLE 1

| Example of Version Table | | |
|---|---|---|
| Application Name | Application Version No. | Latest Version Flag |
| login_screen | V1.R2.M0006 | Current (C) |
| login_screen | V1.R2.M0005 | Workable (W) |
| login_screen | V1.R1.M0004 | Expired (E) |
| login_screen | V1.R1.M0003 | Expired (E) |

The version table is used to check the version of an applet 416 cached or otherwise stored by the client 402, in order to determine if the applet 416 may be properly used with the host 400. When an applets' code execution is initiated by the client 402, the applet checks its version against those stored in the version table to determine if the applet needs to be updated or if it can be used with the host 400, as will be described hereafter.

In the example shown in FIG. 4, applet 416 is executing within browser 418 on client 402. Applet 416 was downloaded from applet class files 410 in response to a user input to browser 418. Applet 416 performs a data transfer with host 400, in response to various user inputs. For example, applet 416 may provide a form to retrieve data about client 402, such as operating system type, processor type, amount of memory, adapter types, and storage capacity. Also, applet 416 may receive data for display to a user on client 402.

To avoid connection problems with a firewall, applet 416 uses HyperText Transport Protocol (HTTP) to create and open a Uniform Resource Locator (URL) connection to a CGI program or servlet on host 400. In this example, the communication is to a CGI script or a servlet 412. When invoking the CGI script or a servlet 412, some parameters may be passed to these programs through the use of a "Path info" and/or "Query string." These parameters may be optionally included in the URL used to establish the connection. The value of these parameters may be used to cause the CGI script or a servlet 412 to execute a selected operation on the data. The "Path info" or "Query string" is part of the URL string, and as such is sent to the host, or more appropriately to the CGI script or servlet at the host, as part of the creation of the URL connection.

All of the data from the applet 416 may be passed to the CGI script or a servlet 412 in an output stream, simulating a POST method used by a browser. A POST method is used to send data in an HTML form, in a client browser, to the server.

Next, the CGI script or a servlet 412 may process the data and store the data in data storage 414 or retrieve other data from data storage 414. Return data may be returned to the applet 416 by the CGI script or a servlet 412 in an input stream of the applet 416.

With the present invention, when a user initiates the applet 416 by, for example, visiting a web page that contains an applet with his/her browser, the applet 416 initiates communication with the host 400 it was launched from. By stating that the applet 416 initiates communication with the host 400 and performs the functions described hereafter, what is meant is that the applet 416 contains classes whose function is to perform the version check of the present invention. Thus, the applet 416 contains not only the bytecode necessary to perform the functions specific to the applet 416 but also the bytecode for version verification.

Upon initiation, the applet 416 passes two pieces of data to a servlet or CGI script 412 at the host 400:

1. Applet Name. This is the APPL_NAME column in the APPL_VERSION table in the data storage 414, described above. An example would be "PBDApplet" or "login_screen"; and
2. The version number that is burned into the byte code of the applet class. An example would be "V1.R2.M0005". The preferred method to tie the version number of the applet to the applet itself is to "burn" the version number into the applet bytecode. This is done by defining a constant in the applet Java source code, such as:
private static final String APPLET_VERSION="V1.R2.M005"

Next, the servlet or CGI script 412 uses this data to query the data storage 414. The data storage 414 looks-up the applet name and version number in the version table and returns two pieces of data back to the servlet or CGI script 412:

1. The current version number for this applet in the data storage 414. This is the VERSION_NBR in the APPL_VERSION table. Specifically, this is the row which matches the APPL_NAME sent in by the applet 416 and where the LATEST_VERSION_FLG is set to 'C' by the applet developer. An example would be "V1.R2.M0006"; and
2. The LATEST_VERSION_FLG from the APPL_VERSION table. Specifically, this is the row which matches the APPL_NAME and the VERSION_NBR that was sent in by the applet 416. An example would be "W". The servlet or CGI script 412 then passes these two pieces of data back to the applet 416.

As described above, the LATEST_VERSION_FLG can contain one of the following three values:

1. 'C'—Current (latest version of the applet);
2. 'W'—Workable (user can continue working with applet with reduced functionality); and
3. 'E'—Expired (new applet class(es) must be reloaded into the browser's JVM).

Based on the LATEST_VERSION_FLG value returned to the applet 416, the applet 416 performs one of three functions. If the LATEST_VERSION_FLG is 'C' indicating that the applet 416 is the latest version of the applet, then the applet start executing the mainline code of the applet 416. If the LATEST_VERSION_FLG is 'E' the applet 416 does not run the mainline code but instead either provides the user with instructions on how to clear the applet classes from the cache and reload the applet 416 from the server, or will attempt to automatically clear the applet classes from the cache.

If the LATEST_VERSION_FLG is 'W', the applet 416 first provides the user of the client 402 with a selection of either continuing with the version of the applet 416 cached with the possibility that the cached version has less functionality than the current version of the applet 416, or updating the applet 416 from the host 400 and then executing the mainline code of the applet 416. If the user selects to continue with the version of the applet 416 that is cached, the mainline code of the cached version of the applet 416 is executed. If the user selects to update the applet 416, the applet 416 either provides the user with instructions on how to clear the applet classes from the cache and reload the applet 416 from the host 400, or will attempt to automatically clear the applet classes from the cache.

Because there a plurality of browsers in use today, in order to clear applet classes from a cache, it may be necessary to know the type of browser for which the applet is designed. This is because the command to clear the cache may be different in each browser. Thus, for example, the command to clear the cache and reload the applet classes in Netscape™ is to hold the shift key and select the "reload" command. Similarly, the command in Microsoft Internet Explorer™ is to hold the control key and select the "refresh" command.

The present invention may inform the user of the proper sequence to be used to clear the applet classes from the cache. The present invention may inform the user using a dialog box that provides each of the proper commands for each of the possible browsers thereby relying on the user to select the command sequence that is specified for the browser being used by the client 402.

Alternatively, the applet 416 may look at the system property of the applet using the system.getproperty class and java.vendor class to identify the browser being used with the applet 416. After identifying the browser, the applet may then provide the proper command sequence to the user via a dialog box, or the like, to thereby inform the user how to clear the applet classes and reload them.

Moreover, after identifying the browser in the manner described above, the present invention may automatically enter the command sequence to clear the applet classes from the cache and reload them. To automatically enter the command sequence, the applet provides the proper command string to the browser to cause the browser to perform the functions of clearing the cache and sending a request to the host 400 for the applet.

FIG. 5 is a flowchart outlining an exemplary operation of the present invention. As shown in FIG. 5, the operation starts with initialization of an applet (step 510). The applet sends a request to the host server for current version and latest version flag information (step 520). A determination is then made as to whether the latest version flag indicates that the applet is current (step 530). If so, the mainline code of the applet is executed (step 580).

If the applet is not the current version, a determination is made as to whether the applet is a workable version (step 540). If not, the applet is updated (step 550) and the operation returns to step 510. If so, the user is provided with the option of either continuing with the applet version that is cached or to update the applet (step 560). If the user selects to update the applet (step 570), the operation continues to step 550. If the user selects to continue with the version of the applet cached, the operation continues to step 580 wherein the mainline code of the applet is executed and the operation then ends.

Thus, the present invention provides a mechanism by which versions of applets may be checked for compatibility with Java code stored on the host server from which the applet was launched. The present invention further provides a mechanism by which the user may be informed of the proper procedure for updating the applet and, in the alternative, for automatically updating the applet based on the type of browser being used.

While the present invention has been described with regard to an embodiment in which an applet contains classes to perform the version verification, the present invention is not limited to such. Rather, the version verification may be performed by a software/hardware element, such as a Java application, outside the applet without departing from the spirit and scope of the present invention. A Java application, in contrast to a Java applet, has a main( ) method, runs in the Java Runtime Environment (JRE) installed on the operating system of a client machine and does not need a JVM enabled browser for execution.

For example, the JVM may contain Java application bytecode that is used to perform the version verification in accordance with the present invention. In such an embodiment, upon for example, initial user login of the Java application, the application will suspend execution of the mainline code until the version verification is performed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for verifying a version of an applet, comprising:
a communications device; and
a processor coupled to the communications device, wherein the processor sends, via the communications device, a request for latest version information for the applet to a host, receives the latest version information for the applet via the communications device, determines if the applet is usable with the host based on the latest version information by determining if the latest version information identifies the applet as being a current version, a workable version or an expired version, and if the latest version information identifies the applet as being a workable version, provides a user with an option to either continue with executing the applet or to update the applet.

2. The apparatus of claim 1, wherein if the latest version information identifies the applet as being a current version, the processor executes the applet.

3. The apparatus of claim 1, wherein if the latest version information identifies the applet as being an expired version, the processor updates the applet.

4. The apparatus of claim 1, wherein the processor updates the applet based on results of determining if the applet is usable with the host based on the latest version information, and wherein the processor updates the applet by clearing applet classes from a cache and requesting the applet from the host.

5. The apparatus of claim 3, wherein the processor updates the applet by providing a user with instructions on how to clear applet classes from a cache and request the applet from a server.

6. The apparatus of claim 5, wherein the processor determines a browser being used with the applet, and wherein the instructions are specific to the browser.

7. The apparatus of claim 1, wherein the processor and the communications device are part of a client device and the host is a server.

8. The apparatus of claim 1, wherein the processor updates the applet if the applet is not usable with the host.

9. An apparatus for verifying a version of an applet, comprising: a communications device; a processor coupled to the communications device; and a storage device coupled to the processor, the storage device containing a first version of the applet; wherein the processor sends, via the communications device, a request for latest version information for the applet to a host, receives the latest version information for the applet via the communications device, determines from the latest version information whether the first version of the applet is a latest version, if the first version is not the latest version, determines whether the first version is usable with the host by determining if the latest version information identifies the applet as being a current version, a workable version or an expired version, and if the latest version information identifies the applet as being a workable version, provides a user with an option to either continue with executing the applet or to update the applet.

10. The apparatus of claim 9, wherein if the first applet is identified as being a current version, the processor executes the applet.

11. The apparatus of claim 9, wherein the processor updates the applet by clearing applet classes from a cache and requesting the current version of the applet from the host.

12. The apparatus of claim 9, wherein the processor updates the applet by providing a user with instructions on how to clear applet classes from a cache and request the applet from a server.

13. The apparatus of claim 12, wherein the processor determines a browser being used with the applet, and wherein the instructions are specific to the browser.

* * * * *